United States Patent [19]

Hetz

[11] Patent Number: 4,534,102

[45] Date of Patent: Aug. 13, 1985

[54] METHOD OF MAKING POLYMERIC BELT CUTTING APPARATUS

[76] Inventor: G. Brian Hetz, 1733 E. Holiday, Springfield, Mo. 65807

[21] Appl. No.: 544,929

[22] Filed: Oct. 24, 1983 (Under 37 CFR 1.47)

Related U.S. Application Data

[62] Division of Ser. No. 267,189, May 26, 1981, Pat. No. 4,496,269.

[51] Int. Cl.³ .......... B29H 7/22

[52] U.S. Cl. .......... 29/558; 29/33 K; 76/101 A

[58] Field of Search .......... 29/417, 557, 558, 33 K; 144/229, 230; 76/101 A; 409/131, 132, 136, 157, 143, 161, 145, 166, 165, 184, 197, 203; 407/118

[56] References Cited

U.S. PATENT DOCUMENTS 3,818,576 6/1974 Braden et al. .......... 29/417 X 3,933,189 1/1976 Boles et al. .......... 144/230 X 4,009,742 3/1977 Ziegelmeyer .......... 144/230

FOREIGN PATENT DOCUMENTS 2154 1/1981 Japan .

*Primary Examiner*—Z. R. Bilinsky

*Attorney, Agent, or Firm*—Joseph V. Tassone

[57] ABSTRACT

A belt cutting apparatus and method of making same are provided for cutting a non-contoured and cured polymeric belt sleeve to define an endless power transmission belt construction having at least one pair of opposed non-parallel side portions wherein such apparatus utilizes a rotatable cutting instrument comprised of a rotatable support body having a central axis, at least one rake-like cutting bar having an elongate axis and having cutting means provided thereon as an integral part thereof with the cutting means providing the belt construction, and means supporting the bar on the body with its elongate axis parallel to and radially spaced from the central axis and wherein the cutting means extends perpendicular to the elongate axis.

5 Claims, 9 Drawing Figures

METHOD OF MAKING POLYMERIC BELT CUTTING APPARATUS

CROSS REFERENCE TO RELATED APPLICATION

This application is a divisional patent application of its copending parent patent application, Ser. No. 267,189, filed May 26, 1981, now U.S. Pat. No. 4,496,269.

BACKGROUND OF THE INVENTION

1. Field of the Invention

This invention relates to an apparatus for cutting a polymeric belt sleeve to define an endless power transmission belt construction and to a method of making such an apparatus.

2. Prior Art Statement

It is known in the art to provide an apparatus for cutting a non-contoured and cured polymeric belt sleeve to define an endless power transmission belt construction having at least one pair of opposed non-parallel side portions and wherein the apparatus comprises a mandrel for supporting the belt sleeve for rotation about a longitudinal axis, means for rotating the mandrel and belt sleeve about the longitudinal axis, a rotatable cutting instrument having at least one pair of substantially identical symmetrically arranged and outwardly diverging integral cutting means for cutting a pair of side portions, means for rotating the cutting instrument, and means for moving the cutting instrument toward and away from the sleeve with the moving means being adapted to urge the cutting instrument during rotation thereof against a rotating belt sleeve to define a belt construction; and, such an apparatus is disclosed in U.S. Pat. No. 3,891,405 wherein the cutting instrument is in the form of a specially contoured grinding wheel.

It is also believed known to provide a molded and cured belt sleeve having individual belt projections of a generally trapezoidal cross-sectional configuration extending outwardly therefrom and then cutting the converging side edges of each projection with a milling apparatus to final contour those side edges, a plurality of such projections being so simultaneously milled by the milling apparatus. Thereafter, the free ends of the belt projections are milled to provide the final configuration thereof between their respective converging side walls.

It is also known in the art to cut individual belts from a rotating belt sleeve using a cutter which may be either a pizza-type rotary cutter or a simple straight knife cutter each of which provides a slitting action.

It is also known to cut flat sheets of polymeric material, such as sheets of uncured rubber, for example, using a pizza-type rotary cutter of the character mentioned, in what amounts to a slitting operation, to provide strips from each flat polymeric sheet which may be used in making an endless power transmission belt construction.

Finally, it is known in the art to provide a rotatable cutting instrument which has a metal cutting tool disposed in radially spaced relation from its axis of rotation and such a tool has been proposed for cutting hard, comparatively rigid yet non-yielding materials, such as, wood, for example.

SUMMARY

It is a feature of this invention to provide an improved apparatus for cutting a non-contoured and cured polymeric belt sleeve to define an endless power transmission belt construction having at least one pair of opposed non-parallel side portions with the apparatus comprising, a mandrel for supporting the belt sleeve for rotation about a longitudinal axis, means for rotating the mandrel and belt sleeve about the longitudinal axis, a rotatable cutting instrument having at least one pair of substantially identical symmetrically arranged and outwardly diverging integral cutting means for cutting the pair of side portions, means for rotating the cutting instrument, and means for moving the cutting instrument toward and away from the sleeve, wherein the moving means is adapted to urge the cutting instrument during rotation thereof against the rotating belt sleeve to define the belt construction.

For example, in accordance with one embodiment of this invention, the cutting instrument comprises a support body having a central axis, at least one rake-like cutting bar having an elongate axis and having the one pair of cutting means provided thereon as an integral part thereof, and means supporting the bar on the body with said elongate axis parallel to and in radially spaced relation from the central axis with the one pair of cutting means extending perpendicular to the elongate axis.

In accordance with another embodiment of this invention an improved cutting instrument is provided as part of a cutting apparatus and is used to cut a non-contoured and cured belt sleeve to define an endless power transmission belt construction having alternating belt projections and grooves. The cutting instrument comprises a plurality of cutting bars supported on a support body with each bar having an elongate axis and each bar having integral spaced parallel teeth which define cutting projections and are disposed perpendicular to their elongate axis, each of said teeth having integral knife-like cutting edges defining opposite sides thereof, and means supporting each bar on the body with its elongate axis parallel to the said central axis and with each bar on a common cylindrical arrangement with the other bars, said supporting means also supporting each bar with each tooth thereof circumferentially aligned with corresponding teeth of the remaining bars and each tooth cooperating with said corresponding teeth to define the integral cutting means for cutting an associated pair of side walls of an associated groove of the belt construction.

Another feature of this invention is to provide a cutting apparatus of the character mentioned wherein the cutting instrument is comprised of a plurality of support bodies of the character mentioned with each support body having substantially identical components and with the plurality of support bodies being supported and fixed on a common central support shaft in axially aligned relation.

Another feature of this invention is to provide an apparatus of the character mentioned wherein the parallel cutting bars of each support body are angularly displaced on their central support shaft relative to the cutting bars of an immediately adjacent support body resulting in less power being required to provide cutting rotation of the cutting instrument with its plurality of axially aligned bodies.

Another feature of this invention is to provide an improved method of making a cutting apparatus of the character mentioned.

Therefore, it is an object of this invention to provide an improved apparatus for cutting a polymeric belt sleeve, and method of making such an apparatus, having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
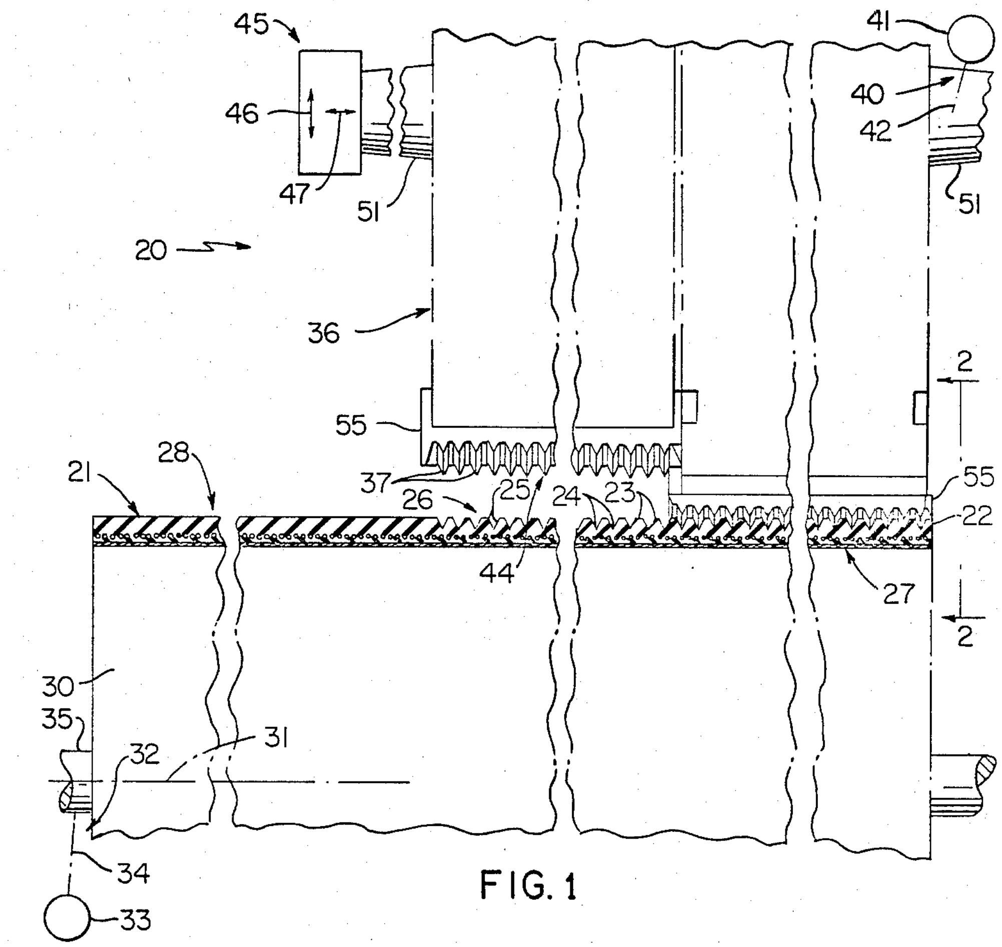
FIG. 1 is a view with parts in elevation, parts in cross section, and parts broken away, particularly illustrating one exemplary embodiment of the apparatus of this invention.

Reference is now made to FIG. 1 of the drawings which illustrates one exemplary embodiment of a cutting apparatus of this invention which is designated generally by the reference numeral 20. The apparatus 20 is particularly adapted for cutting a polymeric belt sleeve 21 to define an endless power transmission belt construction 22 which has a plurality of alternating annular belt projections 23 and grooves 24 wherein each of the grooves has, i.e., is defined by, a pair of symmetrical radially diverging side walls each designated by the same reference numeral 25 and as shown at a typical location 26 in FIG. 1. The belt construction 22 is shown being defined by metal machine tool cutting action at the right side portion 27 of the belt sleeve 21 of FIG. 1, and it will be appreciated that cooperating components of the cutting apparatus 20 are adapted to be relatively moved so that the left side portion 28 of such belt sleeve may be similarly defined or cut so that the entire belt sleeve 21 will have alternating annular belt projections and grooves along its entire axial length.

The apparatus 20 comprises a mandrel 30 for supporting the belt sleeve 21 for rotation about a longitudinal axis 31 and means designated generally by the reference numeral 32 for rotating the mandrel 30 and belt sleeve 21 about such axis 31. The rotating means 32 may be any suitable means employed in the art for this purpose and in this example comprises an electric motor 33 which is suitably mechanically connected by a mechanical connection 34 to the central shaft 35 of the mandrel 30.

The apparatus 20 also has a rotatable cutting instrument 36 which has axially spaced cutting projections each designated by the same reference numeral 37 and the projections are provided for cutting the annular grooves 24 in the belt sleeve 21. The apparatus 20 also has means 40 for rotating the cutting instrument 36 and in this example such rotating means 40 comprises a drive motor 41 which is suitably operatively connected by a mechanical connection 42 to a central support shaft 51 for the rotatable cutting instrument 36. Each of the cutting projections has integral cutting means 44 for cutting an associated pair of the symmetrical side walls 25 of an associated groove 24 and the integral cutting means 44 will be described in more detail subsequently.

The apparatus 20 has means for moving the cutting instrument relative to the belt sleeve 21 and its mandrel 30; and, such moving means is designated generally by the reference numeral 45. The moving means 45 comprises a first moving means or mechanism 46, of any suitable type known in the art, which is particularly adapted for moving the cutting instrument 36 toward and away from the sleeve 21 and such moving mechanism 46 is indicated schematically by a double arrow 46. The moving means 45 also comprises a second moving means or mechanism 47, which is also of any suitable type known in the art and used for moving the cutting instrument 36 in a direction parallel to the longitudinal axis 31 of the mandrel 30 and sleeve 21, and such longitudinal moving means 47 is also indicated schematically by a double arrow 47. The moving means or mechanism 46 is adapted to urge the cutting instrument 36 during rotation thereof by the rotating means 40 against the rotating belt sleeve 21 as rotated by its rotating means 32 to define the belt construction 22 with its alternating annular projections 23 and grooves 24.

Figure 2:
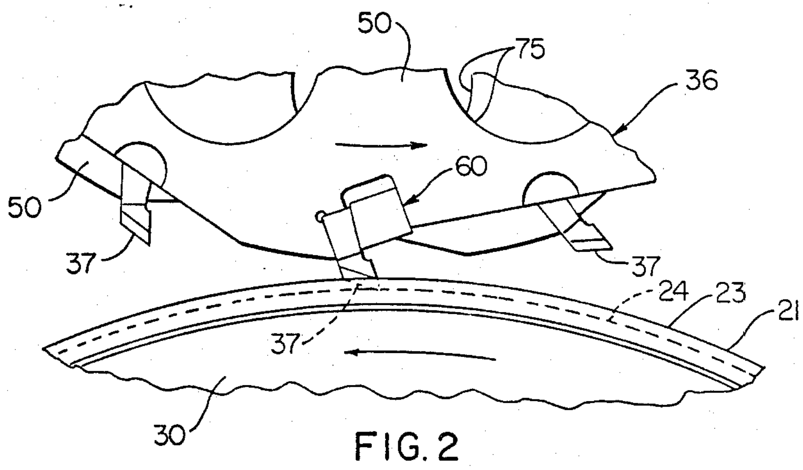
FIG. 2 is an enlarged fragmentary view taken essentially on the line 2—2 of FIG. 1.

In the overall operation of the apparatus 20, the mandrel 30 is rotated by rotating its support shaft with the rotating means 32. In this disclosure, the mandrel 30 and its sleeve 21 are rotated in one direction, shown as counterclockwise in FIG. 2. The rotatable cutting instrument 36 is also rotated counterclockwise by its rotating means 40 so that as the cutting instrument 36 is moved with its cutting projections 37 into cutting engagement with the belt sleeve 21 and an efficient and high speed cutting action is provided.

In accordance with the teachings of this invention, the cutting instrument 36 comprises a plurality of support bodies and in this example of the invention a plurality of two support bodies is provided and each is designated by the same reference numeral 50. The cutting instrument 36 also comprises the previously mentioned central support shaft 51 and means designated generally by the reference numeral 52 fixing the support bodies 50 concentrically around and in side-by-side relation on the shaft 51 with their central axes, each designated by the reference numeral 53, coaxially aligned on a common axis which is also designated by the reference numeral 53. The fixing means 52 serves to fix the support bodies 50 on the shaft 51 in side-by-side relation and such fixing means 52 will be described in more detail subsequently.

Figure 3:
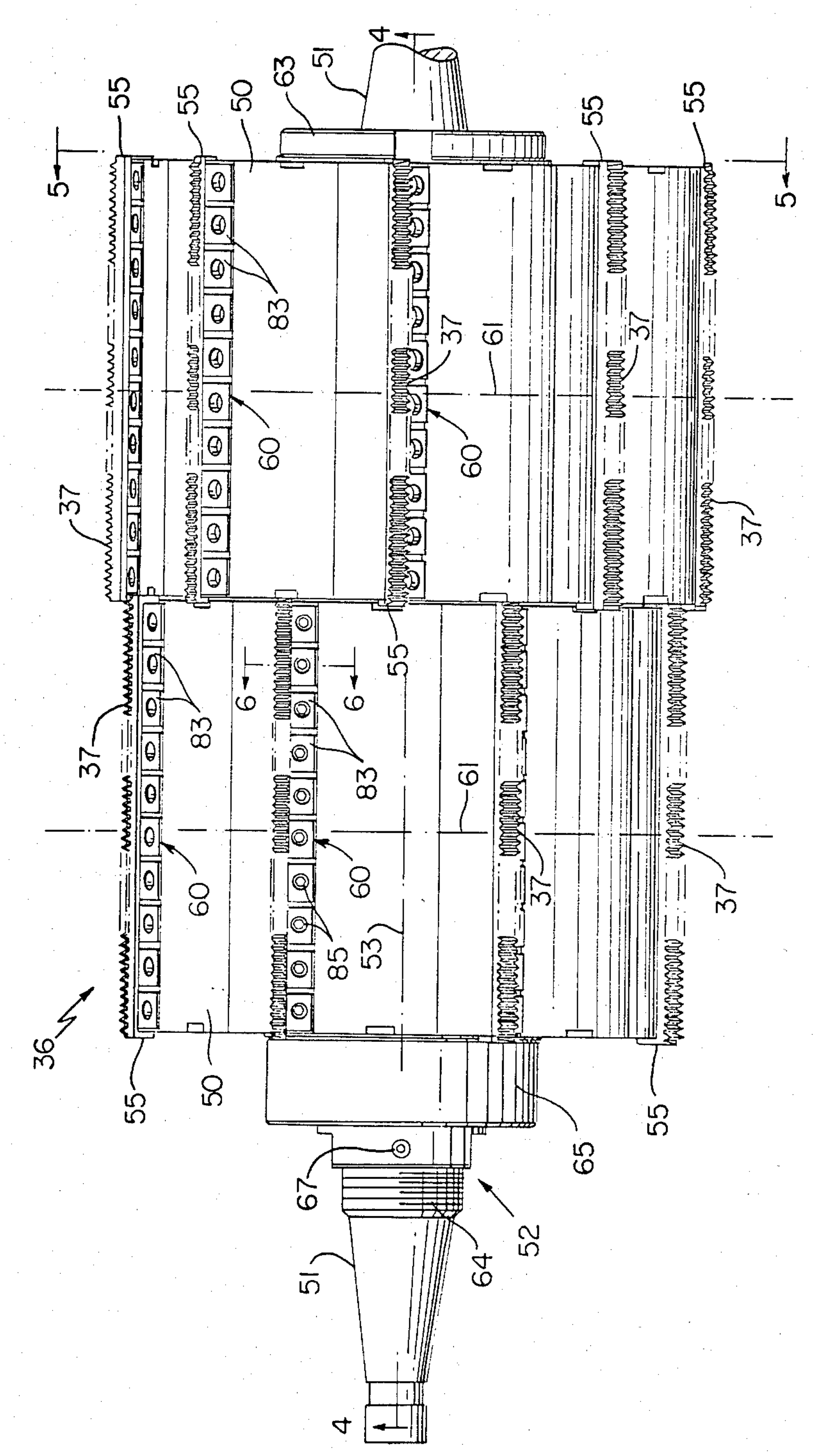
FIG. 3 is a view in elevation, with parts broken away, illustrating the rotatable cutting instrument of the apparatus of FIG. 1.
Figure 4:
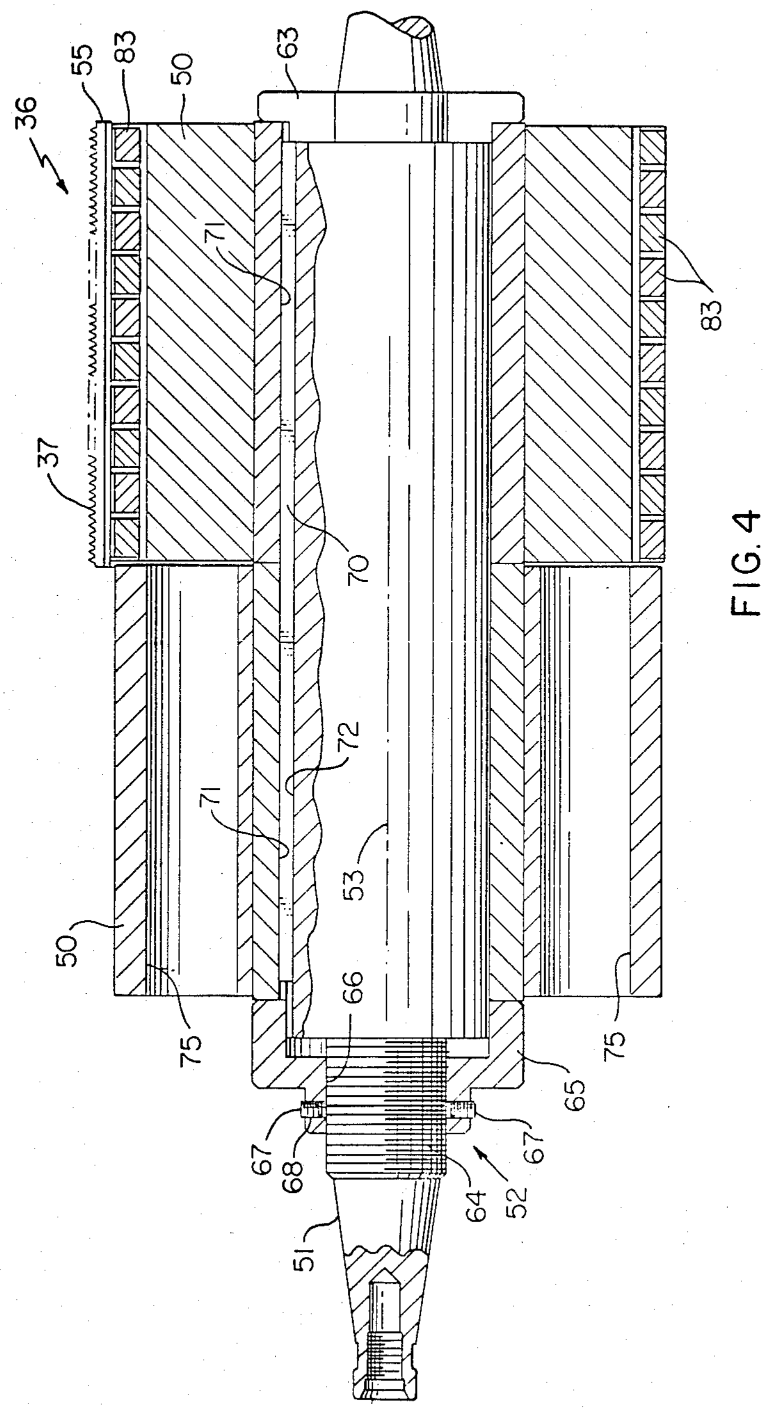
FIG. 4 is a view with parts in cross section and parts in elevation taken essentially on the line 4—4 of FIG. 3.

As best seen in FIGS. 1, 3, and 4 the cutting instrument 36 of this example is comprised of a plurality of two support bodies 50 which are fixed in position in side-by-side relation on the central support shaft 51. However, it will be appreciated that the cutting instrument 36 may consist of a single body 50 or a plurality of more than two bodies 50. Further, in instances where a plurality of side-by-side bodies are employed suitable provisions are made to assure that the cutting projections provided on each body 50 in the vicinity where two bodies 50 adjoin cut precise belt grooves.

The two support bodies 50 of the cutting instrument 36 are substantially identical and have substantially identical component portions. Accordingly, each support body 50 has a central axis 53 and has a plurality of rake-like cutting bars supported thereon with each bar being designated by the same reference numeral 55 and with only a representative few of such bars being thus designated.

Figure 8:
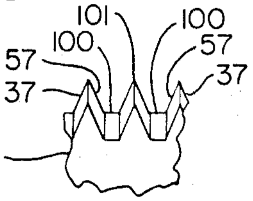
FIG. 8 is an enlarged view in elevation particularly illustrating a fragmentary portion of a typical cutting bar comprising the cutting instrument of FIG. 1.

Each rake-like cutting bar is an elongate bar and thus has an elongate axis and each bar 55 has integral spaced parallel teeth each designated by the same reference numeral 37 with only a representative few of such teeth being thus designated. The teeth 37 define the cutting projections 37 previously described, and, as shown in FIG. 8 each of the teeth has integral knife-like cutting edges designated by the same reference numeral 57 defining opposite sides thereof.

The cutting instrument 36 also has means supporting each bar 55 on the body 50 and such supporting means is designated generally by the reference numeral 60 in FIG. 3. The supporting means 60 supports each bar on the body with its elongate axis parallel to the central axis 53 and with each bar on a common cylindrical arrangement with the other bars and as will be readily apparent from FIG. 5 of the drawings. The supporting means 60 also supports each bar 55 with each tooth or cutting projection 37 thereof circumferentially aligned with corresponding teeth of the remaining bars and to indicate this fact a representative dot-dash line 61 is provided on each support body 50 illustrated in FIG. 3. Thus, each tooth 37 of each rake-like cutting bar 55 cooperates with corresponding teeth 37 as circumferentially aligned to define integral cutting means for cutting an associated pair of side walls 25 of an associated groove 24.

The cutting instrument 36 employs a plurality of eight bars 55 on each support body 50 on a cylindrical arrangement whereby the eight bars of each body are disposed with an equal angular distance therebetween of 45°. The corresponding teeth 37 in the eight bars are circumferentially aligned whereby upon bringing the rotatable cutting instrument 36 into cutting engagement with the belt sleeve 21 all eight circumferentially aligned teeth cooperate to define an associated belt groove 24 and in particular the side walls 25 defining such associated groove 24.

Figure 5:
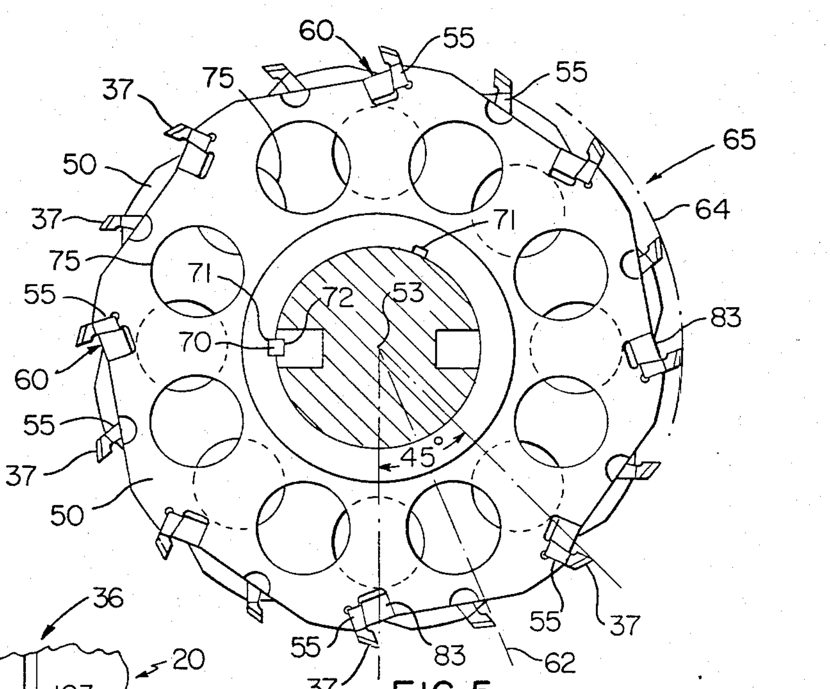
FIG. 5 is a view taken essentially on the line 5—5 of FIG. 3.

The cutting instrument 36 of this example employs a plurality of cutting bars 55 on one body, the right body of FIG. 3, and also employs another plurality of cutting bars 55, which will be referred to as a second plurality of cutting bars 55, and such second plurality of bars are on the left support body as viewed in FIG. 3. The left bars, i.e., those on the left body 50 of FIG. 3, are further angularly displaced with respect to the cutting bars associated with the body 50 at the right in FIG. 3, and this fact will be readily apparent from FIG. 5 of the drawings wherein the second plurality of bars 55 are displaced midway between the 45° angle between each set of immediately adjacent bars and as shown by a representative dotted radial line 62 in FIG. 5. Yet, as seen in FIG. 5 all cutting bars 55 (supported on both bodies 50) are disposed on a cylindrical arrangement and such cylindrical arrangement for all bars of both bodies may be considered as an extended cylindrical arrangement 64 which is only partially illustrated by dotted lines 64 extending over a short arcuate length at 65.

As previously mentioned fixing means 52 is provided for fixing the support bodies on the central support shaft 51 and such fixing means comprises a stop in the form of a stop member 63 which is fixed to one end of the support shaft 51 as shown in FIGS. 3 and 4. The stop member 63 may be fixed in position utilizing any suitable means known in the art including cooperating threads on the member 63 and shaft 51.

As best seen in FIG. 4, the fixing means 52 also comprises a threaded portion 64 at the end of the support shaft 51 opposite from the stop member 63 and a collar 65 which has internal threads 66 provided therein which are adapted to be threaded on the threaded portion 64 with the support bodies 50 disposed in their side-by-side relation on the shaft 51. The fixing means also comprises a plurality of set screws 67 which are threaded through threaded openings 68 in a reduced diameter portion of the collar 65 at diametrically opposed positions thereof. The set screws 67 engage the support shaft 51 and prevent unthreading of the collar 65 once the bodies are in the desired side-by-side relation on the support shaft 51 and sandwiched between the stop 63 and collar 65.

The fixing means 52 also comprises a single key 70 disposed between the support bodies 50 and the central support shaft 51. The key 70 which is disposed in cooperating keyways 71 and 72 provided in each body 50 and the central shaft 51 (FIG. 5) respectively with such keyways also comprising the fixing means. As stated earlier, the support bodies 50 are identical and each is provided with a plurality of keyways 71 extending therethrough which enable rotational displacement of one support body and its components with respect to the other support body and its components yet the same key 70 is used between each body 50 and the shaft 51 as a part of the fixing means 52 and serves to prevent relative rotation between the support bodies 50 and the central support shaft 51.

As best seen in FIGS. 4 and 5 of the drawings each support body 50 has a plurality of substantially identical bores 75 extending therethrough in parallel relation and symmetrically about the central axis 53 of each body 50; and, only a representative few of such bores will be designated by the reference numeral 75. Any desired plurality of such bores may be provided and preferably on a common circumference. The bores 75 serve as lightening holes for each body 51 and thus for the overall rotatable cutting instrument 36 and serve to minimize or reduce the amount of power required to operate the cutting instrument 36.

Figure 6:
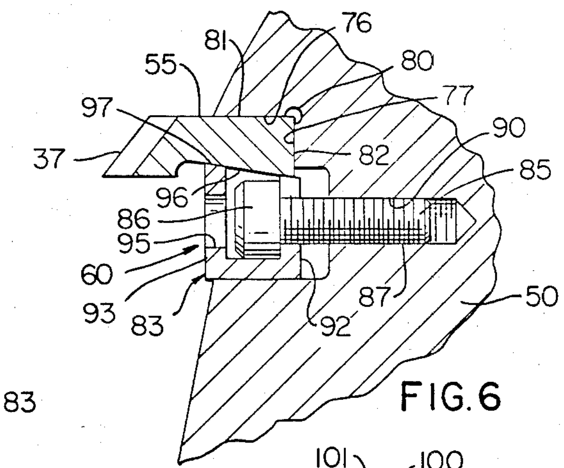
FIG. 6 is an enlarged fragmentary view with parts in cross section and a portion in elevation particularly illustrating means employed in supporting each rake-like cutting bar on its associated support body, including a wedge.

As previously indicated the cutting instrument 36 has means 60 (FIG. 3) supporting each bar 55 on the support body 50. As best seen in FIG. 6, the supporting means 60 comprises a longitudinal cutout in each body 50 with each cutout defining cooperating adjoining positioning surfaces 76 and 77, which in this example of the invention are disposed substantially at 90° of each other in an L-shaped arrangement and have a relief area 80 at their junction. The positioning surfaces 76 and 77 are adapted to be engaged by associated surfaces 81 and 82 respectively of an associated rake-like cutting bar 55.

The supporting means 60 also comprises wedge means shown in this example as a plurality of wedges 83 which are adapted to engage each bar 55 and urge the surfaces 81 and 82 thereof against positioning surfaces 76 and 77 respectively. The supporting means 60 also comprises fastening means for detachably fastening the wedges 83 to its body 50 and such fastening means comprises a plurality of threaded fastening screws 85; and, each screw 85 is adapted to fasten an associated wedge 83.

Each fastening screw 85 is a headed bolt or screw and is provided with a socket head 86 at one end and screw threads 87 at or along its opposite end portion. The threads 87 of each screw are adapted to be received within an associated threaded opening 90 in an associated body 50.

Figure 7:
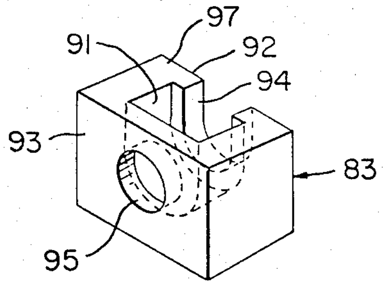
FIG. 7 is a perspective view of the wedge of FIG. 6 which comprises a cutting bar supporting means.

As will be readily apparent from FIG. 7 of the drawings each of the wedges 83 has a hollow central portion 91 therein defining a rear wall 92 and a front wall 93 spaced from the rear wall. A U-shaped cutout 94 is provided in the rear wall and a right circular cylindrical hole 95 is provided in the front wall 93; and, the hole 95 is disposed in aligned relation with the cutout 94. Each headed screw 85 is adapted to be inserted with the head 86 thereof within the hollow central portion 91 of an associated wedge 83 with its threaded portion 87 extending through the U-shaped cut-out 94. Each screw 85 is adapted to be threaded and unthreaded with respect to its threaded opening 90 utilizing a tool (not shown) which is adapted to be extended through the cylindrical hole 95 of its associated wedge 83 with the wedge positioned against an associated bar 55 to fasten and unfasten the bar 55 to its support body 50.

Each bar 55 has an inclined surface 96 which defines a holding surface thereof. Each wedge has a cooperating wedging surface 97 which is adapted to engage the inclined surface 96 and help hold its bar 55 firmly against the positioning surfaces 76 and 77 upon threading an associated one of the fastening screws 85 in position. In this manner, it will be seen that each bar 55 is held firmly in position in a high strength manner by the wedging surfaces 97 of associated wedges 83 urging and in essence serving as a cam surfaces which engage the inclined surface 96 of the bar 55 and hold the bar in position in a precise manner against its associated positioning surfaces 76 and 77.

In this example of the invention each single piece bar 55 is held in position by a plurality of ten wedges 83 and ten associated fastening screws 85. However, it will be appreciated that any desired number of fastening screws 85 and wedges 83 may be utilized for this purpose.

As indicated earlier, the technique of utilizing positioning surfaces 76 and 77 against which each bar 55 is urged by wedges 83 and held firmly in position by threaded screws 85 enables each rake-like cutting bar 55 to be axially positioned with respect to its support body 50 with great precision; and, this may be achieved during assembly of the cutting instrument 36 simply by placing an associated support block 50 on a precision riser block and then positioning each bar 55 against its positioning surfaces 76 and 77 with an end of the bar 55 resting on a precision planar surface, such as a granite surface, or the like. With a particular bar thus positioned the wedges 83 are positioned against the bar and the screws 85 associated therewith are simply threaded in their threaded openings 90. It will be appreciated that each bar 55 is manufactured so that the teeth thereof are provided therealong with precise tolerances and once the ends of the bars are fastened on the support body as described above, each tooth 37 on each bar 55 is circumferentially aligned with corresponding teeth of the remaining bars as previously described.

As best seen in FIG. 8 of the drawings each cutting bar 55 has a plurality of interconnecting cutting edges 100 disposed between its integral cutting projections or teeth 37 with the interconnecting cutting edges 100 being disposed parallel to the elongate axis of the associated bar. The interconnecting cutting edges 100 define the annular belt projections of each belt construction 22 as truncated projections with each having a roughly trapezoidal cross-sectional configuration. The cutting edges 57 on the teeth 37 and the interconnecting cutting edges 100 cooperate to enable cutting or defining of the belt construction 22 free of intermediate steps to precisely size the outside diameter of the belt sleeve 21. In the prior art wherein belt constructions similar to the belt construction 22 are defined by grinding action it is generally necessary to first grind an associated belt sleeve to the required outside diameter and then define the toothed configuration in the belt construction utilizing a contoured grinding wheel. The cutting bars 55 with their cutting teeth or projections 37 and their interconnecting cutting edges 100, in essence, enable defining the belt construction 22 to be cut with optimum efficiency and without requiring pre-sizing of the outside diameter of the belt sleeve 21.

As shown in FIG. 8, the teeth 37 on each bar 55 have their cutting edges 57 disposed in a V-shaped configuration terminating in a cutting apex 101. Each apex 101 is defined by an arc extending on a small radius which may have a typical dimension of 0.004 inch plus or minus 0.002 inch. Each tooth 37 with its side cutting edges 57 and cutting apex 101 defines an associated one of the belt grooves 24 in the belt construction 22 which is substantially V-shaped.

Figure 9:
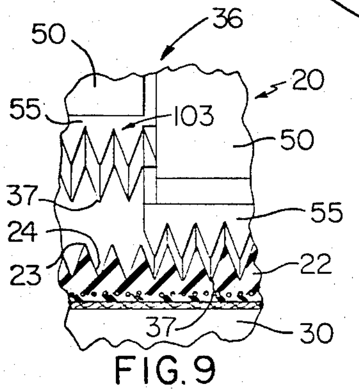
FIG. 9 is an enlarged fragmentary view similar to the central portion of FIG. 1 and illustrating a modified cutting apparatus.

A modification of this invention is illustrated in FIG. 9 of the drawings. In the modification of FIG. 9, all components of the illustrated apparatus (also designated by the reference numeral 20) are identical to the apparatus 20 previously described with the exception of the rotatable cutting instrument 36 which only differs from the previously described rotatable cutting instrument 36 by having different cutting teeth on its cutting bars 55. Accordingly, the teeth 37 on each bar 55 of FIG. 9 have bases which are disposed in adjoining relation as shown at 103 whereby each pair of immediately adjacent teeth 37 cooperate to define an associated one of the projections 23 of the belt construction 22 which is substantially V-shaped. Thus, the modified cutting instrument 36 of FIG. 9 defines the belt construction 22 which has V-shaped projections 23 and V-shaped grooves 24 which extend in an alternating manner along the entire axial length of such belt construction.

In this disclosure of the invention the cutting instrument 36 is shown as having an axial length which is substantially less than the axial length of the belt sleeve 21 to be cut. In actual practice, the standard belt sleeve 21 made using conventional build-up drums or mandrels and conventional curing equipment has an axial length generally of the order of 42 inches. A rotatable cutting instrument 36 defined by two side-by-side support bodies 50 and their cutting bars has a total axial length such that it cuts the belt sleeve 21 an axial length of roughly 14 inches. With this cutting instrument 14 each 42 inch belt sleeve is cut across its full length by indexing the rotatable cutting instrument 36 three times across the sleeve 21 and cutting the sleeve at each of the three positions by bringing the cutting instrument 36 and sleeve 21 in cutting engagement. Thus, alternating projections 23 and recesses 24 are defined along the full axial length of the sleeve 21, thereby defining belt construction 22. In the illustration of FIG. 1 the belt cutting apparatus 20 is shown after the cutting apparatus 36 has taken the first of its three cuts in sleeve 21.

The apparatus 20 is shown herein being utilized to cut the belt sleeve 21 to define the belt construction 22 having a plurality of alternating projections 23 and recesses 24 therealong. However, it will be appreciated that the apparatus of this invention may be modified by shortening the elongate cutting bars 55 thereof so that one or more of such shortened bars may be used to cut the sleeve 21 to define, with each cutting pass, a single endless power transmission belt construction having a pair of opposed non-parallel side portions. In this latter instance, the cutting bar be provided with a single pair of cutting means in the form of a pair of integral knife-like cutting edges 57 interconnected by a cutting edge 100 so that once the support body for the shortened cutting bar is rotated for cutting purposes the shortened cutting bar (or a plurality of such bars) cuts the sleeve 21 to define the single endless power transmission belt construction which has an outer portion of roughly trapezoidal cross-sectional configuration. In this modified apparatus it may be desired to dispose the belt sleeve 21 on its mandrel 30 with a backup sleeve therebetween and the modified cutting bar or bars may also be provided with side cutters, such as belt side cutters, which would cut completely through the belt sleeve 21 into the backup sleeve whereby an entire single element belt construction of trapezoidal cross-section would be defined with each cutting operation.

The apparatus 20 of FIG. 1 may also be modified to provide spaced cutting means such as side cutters at desired intervals along the cutting teeth 37 of the cutting instrument 36 and used with a backup sleeve between the belt sleeve 21 and mandrel 30 whereby a plurality of completed V-ribbed belts or multiple element belts may be defined with each cutting engagement of such modified cutter 36.

The apparatus 20 is illustrated herein as being used to cut a belt sleeve 21 to define a multiple element V-ribbed belt construction 22 from which V-ribbed belts are then cut in a subsequent cutting operation. However, it will be appreciated that the apparatus of this invention may be utilized in defining so-called banded belts (which are known in the art) in a similar manner.

It is also within the scope of this invention to utilize the apparatus of this invention to define a matrix sleeve of the type employed in the method of making belts disclosed in U.S. Pat. No. 3,839,116.

In this disclosure of the invention each rotatable support body 50 supports a plurality of eight rotatable cutting bars 55 on a cylindrical arrangement having a diameter of approximately 10 inches. It has been found that effecient cutting may be achieved by rotating the bodies 50 by rotating the entire cutting instrument at 3600 rpm while rotating the belt sleeve 21 in the usual manner and at the usual speeds employed in cutting a similar sleeve by grinding. However, the results with the apparatus 20 of this invention are dramatic as compared with a belt grinding process. In particular, the cutting action is approximately 10 times faster with practically no heat buildup. Also, the cutting action is such that the moving means 46 may be used to plunge the rotating cutting instrument 36 to its full cutting depth while rotating the sleeve 21 at its usual speed whereby the cutting teeth 37 are at full depth while the sleeve 21 is rotated a mere 5 or 6 inches of its circumferential distance. Further, the belt sleeve is completely cut by defining projections 23 and recesses 24 in one pass, i.e., the entire profile of the projections 23- recesses 24 is defined with a single 360° rotation of the mandrel and sleeve with an overlap only along the 5–6 inch distance where the initial plunging cut takes place.

The cutting bars 55 of the invention are preferably made of any material used to make cutting tools for cutting metal. Especially good results have been obtained with cutting bars made of tungsten carbide. Further, it has been found that a substantial number of belt sleeves 21 may be cut with great effeciency without requiring sharpening of the cutting projections or teeth 37 and in particular the cutting edges 57 and 100.

While present exemplary embodiments of this invention, and methods of practicing the same, have been illustrated and described, it will be recognized that this invention may be otherwise variously embodied and practiced within the scope of the following claims.

What is claimed is:

1. In a method of making an apparatus for cutting a non-contoured and cured polymeric belt sleeve to define an endless power transmission belt construction having a plurality of alternating annular belt projections and grooves; each of said grooves having a pair of symmetrical radially diverging side walls; said method comprising the steps of; providing a mandrel for supporting said belt sleeve for rotation about a longitudinal axis; providing means for rotating said mandrel and belt sleeve about said longitudinal axis; constructing a rotatable cutting instrument having axially spaced cutting projections for cutting said annular grooves with each of said cutting projections having integral cutting means for cutting an associated pair of said symmetrical side walls of an associated groove; providing means for rotating said cutting instrument; and providing means for moving said cutting instrument toward and away from said sleeve with said moving means being adapted to urge said cutting instrument during rotation thereof against the rotating belt sleeve to define said belt construction; the improvement in which said step of constructing said cutting instrument comprises, forming a first support body having a first central axis, defining a plurality of rake-like cutting bars each having an elongate axis and each having integral spaced parallel teeth which define said cutting projections and are disposed perpendicular to their elongate axis, each of said teeth having integral knife-like cutting edges defining opposite sides thereof, supporting each bar on said first support body with supporting means and with its elongate axis parallel to said central axis and with each bar on a common cylindrical arrangement with the other bars, said supporting step resulting in the supporting of each bar with each tooth thereof circumferentially aligned with corresponding teeth of the remaining bars, each tooth cooperating with said corresponding teeth to define said integral cutting means for cutting an associated pair of side walls of an associated groove, forming a second support body having a plurality of cutting bars each being identical to said one cutting bar and having a second central axis, each of said identical cutting bars of said second plurality being supported on said second support body on a common circumference and with the cutting means of each pair thereof in circumferentially aligned relation, providing a central support shaft, fixing said support bodies concentrically around and in side-by-side relation on said shaft with their central axes coaxially aligned on a common axis, angularly arranging said first-named plurality of rake-like cutting bars about said first support body with the same angular displacement therebetween, angularly arranging said second plurality of rake-like cutting bars also about said second support body with said same angular displacement therebetween, and disposing said first and second support bodies so that said second-named cutting bars are angularly displaced with respect to said first-named cutting bars.

2. A method as set forth in claim 1 in which each said step of forming a respective support body comprises forming a plurality of bores in said respective support body which extend therethrough in parallel relation and symmetrically about said central axis, said bores serving as lightening holes for said respective support body.

3. A method as set forth in claim 2 in which said step of forming said bores comprises forming right circular cylindrical bores.

4. A method as set forth in claim 1 in which each said step of supporting each bar comprises, defining a longitudinal cutout in a respective support body to define cooperating positioning surfaces which are adapted to be engaged by associated surfaces of an associated bar, providing wedge means adapted to engage each bar and urge said associated surfaces against said positioning surfaces, providing fastening means, and detachably fastening said wedge means to said respective support body with said fastening means.

5. A method as set forth in claim 1 in which said step of defining said rake-like cutting bars comprises defining each rake-like cutting bar including its integral spaced teeth with integral knife-like cutting edges of a cutting tool metal as a single-piece structure.

* * * * *